US012775972B2

(12) United States Patent
Ma et al.

(10) Patent No.: US 12,775,972 B2
(45) Date of Patent: Oct. 27, 2026

(54) TWO-LAYER BANDIT OPTIMIZATION FOR RECOMMENDATIONS

(71) Applicant: Apple Inc., Cupertino, CA (US)

(72) Inventors: Siyong Ma, Brookline, MA (US); Puja Das, Cupertino, CA (US); Debankur Naskar, San Jose, CA (US); Chandrasekar Venkataraman, Los Altos, CA (US); Sofia M. Nikolakaki, San Jose, CA (US)

(73) Assignee: Apple Inc., Cupertino, CA (US)

( * ) Notice: Subject to any disclaimer, the term of this patent is extended or adjusted under 35 U.S.C. 154(b) by 420 days.

(21) Appl. No.: 18/318,513

(22) Filed: May 16, 2023

(65) Prior Publication Data

US 2023/0385904 A1 Nov. 30, 2023

Related U.S. Application Data

(60) Provisional application No. 63/365,582, filed on May 31, 2022.

(51) Int. Cl.

| | |
|---|---|
| ***G06Q 30/00*** | (2023.01) |
| ***G06Q 30/0204*** | (2023.01) |
| ***G06Q 30/0601*** | (2023.01) |

(52) U.S. Cl.
CPC ..... *G06Q 30/0631* (2013.01); *G06Q 30/0205* (2013.01); *G06Q 30/0603* (2013.01)

(58) Field of Classification Search
CPC ........... G06Q 30/0631; G06Q 30/0205; G06Q 30/0603
See application file for complete search history.

(56) References Cited

U.S. PATENT DOCUMENTS

2019/0370345 A1* 12/2019 Katukuri ............. G06F 16/9535

FOREIGN PATENT DOCUMENTS

EP 3283950 A2 2/2018
WO 2009148781 A1 12/2009

OTHER PUBLICATIONS

M. Barifah and M. Landoni, "Exploring Usage Patterns of a Large-Scale Digital Library," 2019 ACM/IEEE Joint Conference on Digital Libraries (JCDL), Champaign, IL, USA, 2019, pp. 67-76, doi: 10.1109/JCDL.2019.00020. (Year: 2019).*

* cited by examiner

*Primary Examiner* — Anand Loharikar
(74) *Attorney, Agent, or Firm* — Blank Rome LLP

(57) ABSTRACT

A search interface is presented with a search query input component and a suggested results section. The suggested results section includes potential search results selected based on a likelihood of selection of each of the selectable items and a search session history corresponding to a historic selection of each of the selectable items from prior suggested result regions.

20 Claims, 6 Drawing Sheets

TWO-LAYER BANDIT OPTIMIZATION FOR RECOMMENDATIONS

TECHNICAL FIELD

Embodiments described herein relate to a search interface. More particularly, embodiments described herein relate to providing custom suggested catalog items for presentation in a user interface.

BACKGROUND

In recent years, downloading of software applications (or "apps") from an on-line app store has become a popular method for obtaining software applications. An on-line app store allows users to download a software application onto their device—such as a desktop or laptop computer, smartphone, or other mobile device—and then install the app on their device. Prior to downloading an app, users often find apps within the app store. In response to a user search, the app store may provide results to the user with a particular set of representative data, such as an icon, screenshot, text description, or the like.

BRIEF DESCRIPTION OF THE DRAWINGS

Embodiments described herein are illustrated by examples and not limitations in the accompanying drawings, in which like references indicate similar features. Furthermore, in the drawings, some conventional details have been omitted, so as not to obscure the inventive concepts described herein.

DETAILED DESCRIPTION

This disclosure pertains to systems, methods, and computer readable media for providing improved suggested catalog items on a search interface according to one or more embodiments. In particular, embodiments described herein select suggested results based on a likelihood of selection of each of the selectable items and a search session history corresponding to a historic selection of each of the selectable items from prior suggested result regions. The suggested results are presented in a suggestion portion of a search landing page interface.

Some embodiments described herein select suggested items using a two-layer bandit approach which is improved from traditional bandit optimization algorithms, which converge to the best performing content over time. Embodiments described herein ensure diversity in recommendations and prevent content fatigue, while leveraging the dynamic content optimization capabilities of bandits. According to some embodiments, a more exploratory contextual bandit algorithm is used in the first layer to ensure the degree of exploration. A more exploit-intensive bandit algorithm is used as the second layer to rank the content.

In some embodiments, the suggested items are further optimized based on user cohorts. For example, the search session history corresponding to a historic selection of each of the selectable items from prior suggested result regions may be determined for users among a same or similar cohort to the user profile for which the search landing page is presented.

Figure 1:
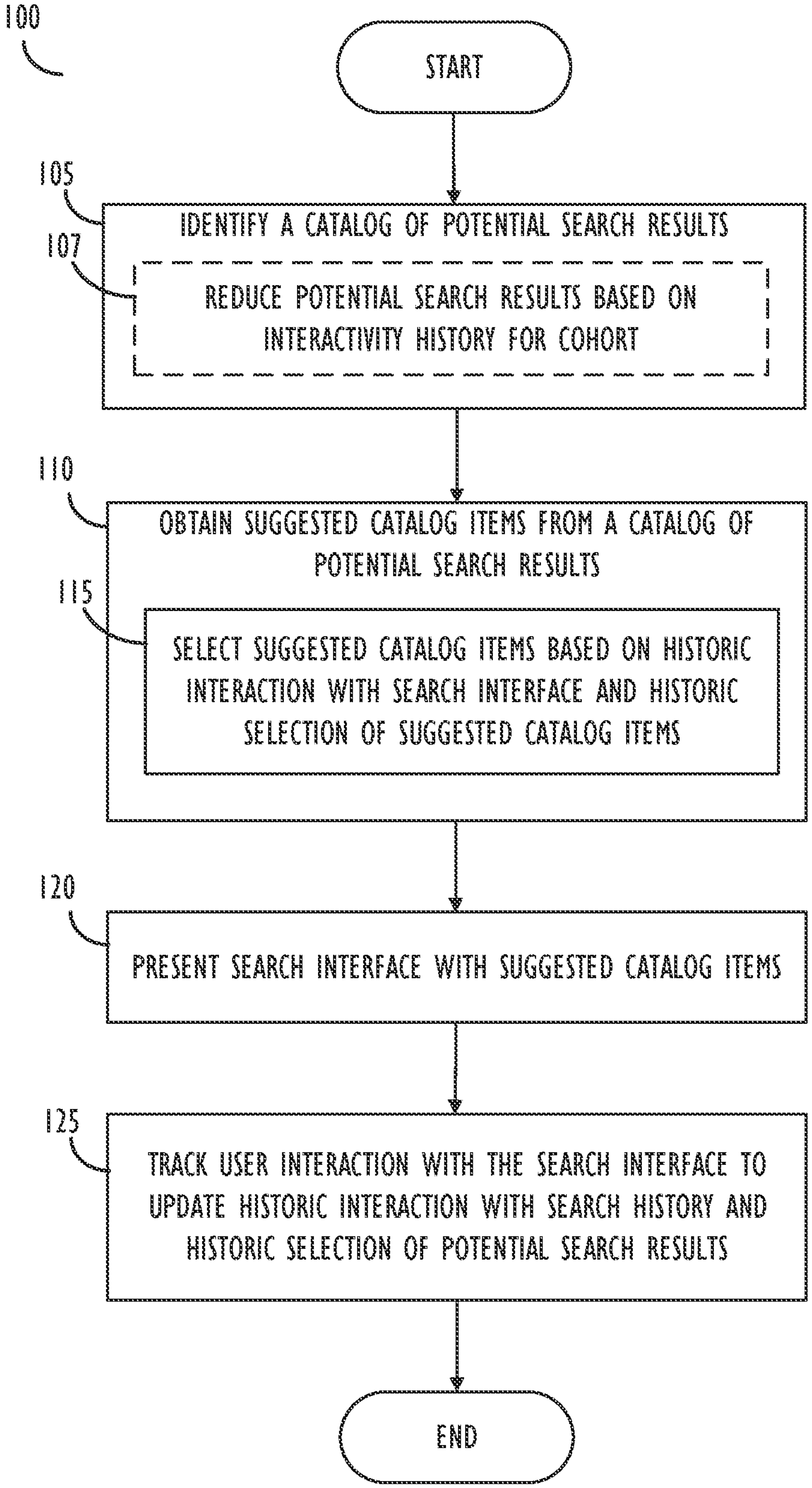
FIG. 1 illustrates a flowchart of a technique for generating suggested catalog items in accordance with some embodiments.

FIG. 1 depicts a flowchart of a technique for generating suggested catalog items for a search landing page in accordance with some embodiments. Although the various actions are depicted in a particular order, in some embodiments the various actions may be performed in a different order. In still other embodiments, two or more of the actions may occur simultaneously. According to yet other embodiments, some of the actions may not be required or other actions may be included. For purposes of clarity, the flowchart will be described with respect to various particular components. However, it should be understood that the various actions may be taken by alternative components, according to one or more embodiments.

The flowchart 100 begins at block 105 where a catalog of potential search results is identified. Embodiments described herein may be applied to a variety of use cases in which a search landing page is employed, such as particular apps, websites, data structures, media content providers, or the like. As an example, the search landing page may be an interface for an app store, and the potential results may be comprised of applications hosted by the app store and which may be searched for via the search landing page. As another example, a website may have a search landing page from which a user may search for other pages that are part of the website. The potential search results may include the pages which are potential search results from that landing page. Said another way, the potential search results can include the catalog of items from which a search query on the search landing page obtains search results.

In some embodiments, the potential search results may optionally be reduced or prioritized based on interactivity history for a cohort to which a current user belongs, as shown at block 107. According to some embodiments, the cohorts may be determined by obtaining, for a pool of users, a set of historic interactions, such as a search and selection history of potential search result items (e.g., from prior suggested catalog items and/or from actual search results). Users may be clustered based on individual sets of historic interactions to identify clusters of users. In some embodiments, the clustering of the items may be weighted, for example, based on timeliness (e.g., items most recently interacted with are given a greater weight) or other considerations.

According to one or more embodiments, the cohorts may be identified by common traits among the users in the cluster. For example, if the search landing page is associated with a search interface for an online game provider, the historic interactions may be based on the online games users have selected from a search, searched for, selected from a suggested catalog items list, or otherwise interacted with. According to one or more embodiments, the common traits among the items that create the cluster may indicate a cluster identity. To continue the previous example, if a cluster includes users that have puzzle games in common, then the cohort that comprises the users may be based on a puzzle game category. In some embodiments, a user can belong to multiple cohorts. As an example, if a user has two strong categories in their history that cause the user to belong to two cohorts, both cohorts may be considered. In some embodiments, the cohort or cohorts to which a user belongs may be refined periodically based on user activity, updated history from the cohorts, and the like.

According to some embodiments, the potential search result catalog may be reduced based on popularity among a current user's cohort or cohorts. In some embodiments, cohort level popularity may be measured based on user interactions with impressions of the apps within the app score. These impressions may include such interactions as download, redownload, manual update, open, purchase, and the like. A popularity metric may be determined for each app of the potential search results. The determined popularity metrics may then be used to reduce the potential search result catalog. For example, a threshold popularity value may be used to reduce the potential search result catalogue. As another example a top predefined percentage of the potential search result catalog may be retained based on popularity values for the apps for the cohort.

The flowchart 100 continues at block 110 where suggested catalog items are obtained from the potential search results. Notably, in some embodiments the potential search results are obtained before a user interacts with a search input component on a search landing page in a search session (for example, during a session in which the user is interacting with the search landing page). In some embodiments, as shown at 115, the suggested catalog items are selected based on historic interaction with the search interface and historic selection of suggested catalog items. For example, the suggested catalog items may be selected based on suggested catalog items presented to other users and which were selected by those users. Further, as will be described in greater detail below, the suggested catalog items may be selected based on user information for which the search landing page is being presented. For example, the historic selection of suggested catalog items may be based on a group of users similar to the current user.

At block 120, the search interface is presented with the suggested catalog items. The search interface can be a search landing page for a particular application, webpage, service, or the like. The search interface may include, for example, a search query input component with which a user may interact to perform a search. The search interface may also include a suggestion section which includes selectable components corresponding to the suggested catalog items presented in the suggestion section. In some embodiments, the search interface is presented in response to a user initiating a search session, for example, by accessing the search landing page. Thus, more suggestions are presented the more the user interacts with a search query input component, such as a search bar.

The flowchart 100 concludes at block 125 where user interaction with the search interface during the search session is tracked. For example, user activity is tracked with respect to any suggested catalog items being selected, interaction with the search query input component, and the like. In some embodiments, the user search history will then be contributed to the historic interaction with the search interface and the historic selection of suggested catalog items, as described above with respect to block 115. In some embodiments, the user interaction detected during the search history may be contributed to a global search history and/or may be contributed to a search history for one or more cohorts to which the user belongs. Accordingly, when another user is presented with the search landing page, the suggested catalog items may be based, in part, on the current user's interaction with the various components of the search landing page. Thus, in some embodiments, a feedback loop is provided for generating the selectable items for the Suggested section of the search landing page.

Figure 2:
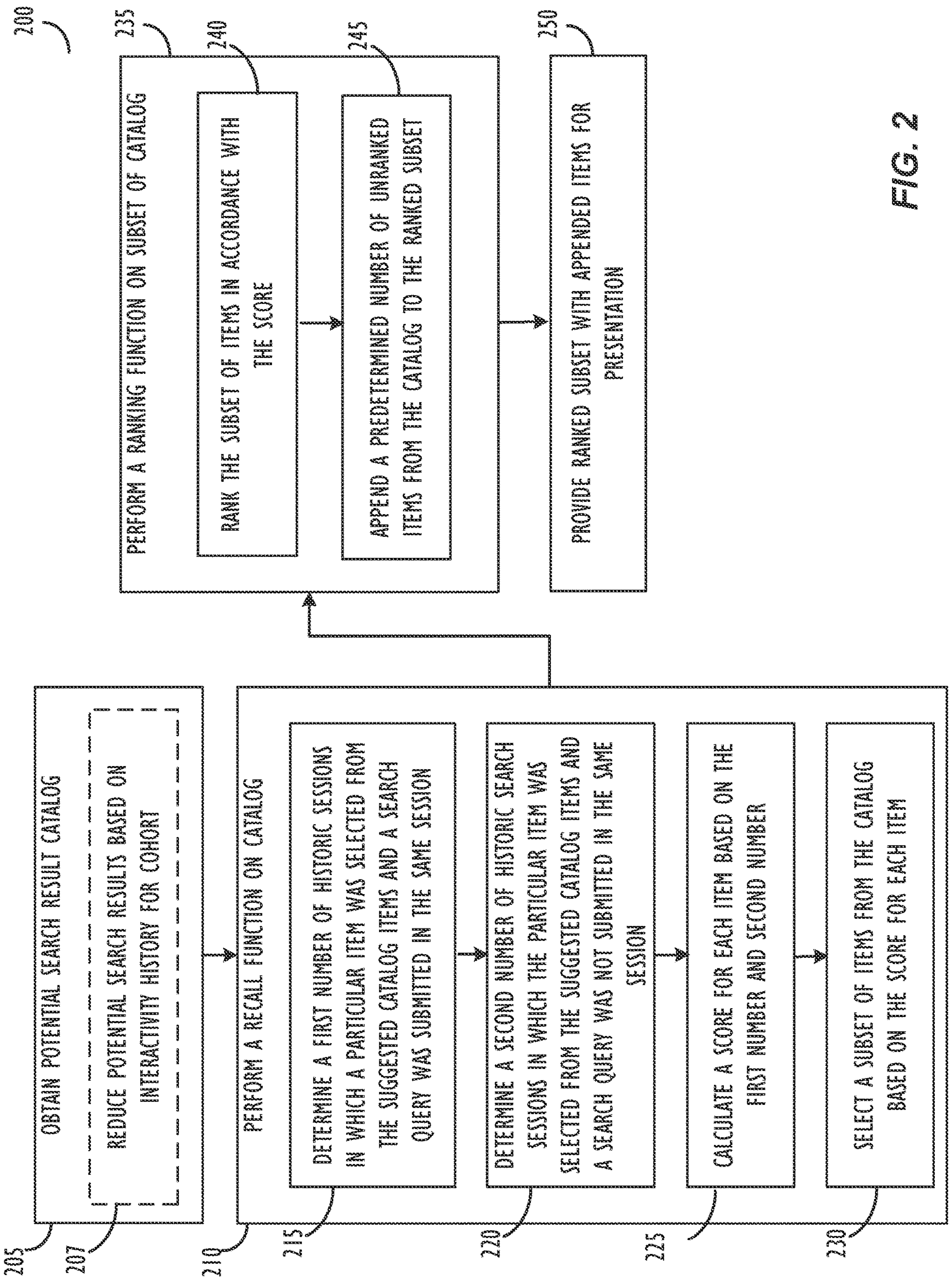
FIG. 2 illustrates a flowchart of a technique for utilizing a two-layer bandit optimization for determining suggested catalog items.

According to some embodiments, the suggested catalog items obtained at block 110 may be selected using a two-layer bandit approach. In particular, some embodiments described herein are directed to utilizing a bandit algorithm that has the advantages of more content diversity and less cannibalization of the search bar. FIG. 2 depicts a flowchart of a technique for implementing a two-layer bandit approach for selecting suggested catalog items in accordance with some embodiments. Although the various actions are depicted in a particular order, in some embodiments, the various actions may be performed in a different order. In still other embodiments, two or more of the actions may occur simultaneously. According to yet other embodiments, some of the actions may not be required or other actions may be included. For purposes of clarity, the flowchart will be described with respect to various particular components. However, it should be understood that the various actions may be taken by alternative components, according to one or more embodiments.

The flowchart 200 includes steps that, in some embodiments, could be performed as part of block 110 of FIG. 1 in which suggested catalog items are obtained from a catalog of potential search results. At block 205, the potential search results are obtained or otherwise accessed. The potential search results may be items available as search results for a particular search query input component when used by a user. In addition, in some embodiments, the potential search results may be items available as a search result to a particular user, for example based on a user profile for a user accessing a search landing page. For example, certain items may be excluded if those items are not available to a user, for example because of geographic restrictions, age restrictions, profile restrictions, or the like.

In some embodiments, the potential search results may optionally be reduced or prioritized based on interactivity history for a cohort to which a current user belongs, as shown at block 207. According to some embodiments, the cohorts may be determined by obtaining, for a pool of users, a set of historic interactions, such as a search and selection history of potential search result items (e.g., from prior suggested catalog items and/or from actual search results). Users may be clustered based on individual sets of historic interactions to identify clusters of users. In some embodiments, the clustering of the items may be weighted, for example, based on timeliness (e.g., items most recently interacted with are given a greater weight) or other considerations. In some embodiments, the cohorts may be identified by common traits among the clusters.

According to some embodiments, the potential search result catalog may be reduced based on popularity among a current user's cohort or cohorts. In some embodiments, cohort level popularity may be measured based on user interactions with impressions of the apps within the app score. These impressions may include such interactions as download, redownload, manual update, open, purchase, and the like. A popularity metric may be determined for each app of the potential search results. The determined popularity metrics may then be used to reduce the potential search result catalog. For example, a threshold popularity value may be used to reduce the potential search result catalogue.

As another example a top predefined percentage of the potential search result catalog may be retained based on popularity values for the apps for the cohort.

The flowchart 200 proceeds at block 210 where a recall function is performed on the catalog. In particular, in some embodiments, the recall function may be a first stage of a bandit operation for selecting the suggested catalog items to present to a user. The recall function creates a set of high performing items. In some embodiments, the recall function may select a pool of items based on a first number of historic search sessions of the search session history. As shown at block 215, a first number may be determined, referring to historic sessions in which 1) a particular selectable item was selected and 2) a search query was submitted in the search query input component (referred to as "S" below). For example, a session begins when a user loads a search landing page. If the search landing page includes a suggested item in the Suggested section that is selected by the user, and the user continues, in the same search session, to additionally use the search landing page to submit a search query, then a count is added to the first number. Further, as shown at block 220, a second number may be determined related to a number of historic search sessions of the search session history in which the particular selectable item was selected without interaction with the search query input component (referred to as "D" below). For example, a session begins when a user loads a search landing page. If the search landing page includes a suggested catalog item in the Suggested section that is selected by the user, and the user discontinues the search session, for example by navigating away from the search page, then the search session is considered to have ended.

At block 225, a score is calculated for each item in the catalog based on the first number and the second number. In some embodiments, a conservative reward is defined as:

$$F_{CC}(i) = S^i - D^i$$

where "i" is each item in the catalog. The recall function may rely on a conversion rate for each item. According to one or more embodiments, the conversion rate is defined as:

$$CR^i = \frac{F_{CC}(i)}{I^i}$$

where "I" is the total number of impressions that item i received from users. According to some embodiments, the number of impressions is based on a number of user sessions that have been impressed with a particular item in the Suggested section of the search landing page. In some embodiments, a Central Limit Theorem may be used to compute a lower confidence bound for each conversion rate normal distribution. Once the lower bound is computed, the values may be normalized.

At block 230, a subset of items is selected from the catalog based on the sore for each item. In some embodiments, a recall set is selected from the items in the catalog based on the scoring described above. By performing the selection as described above, a recall set of high performing results are retrieved while providing space for exploratory content. In some embodiments, a Thompson sampling technique may be performed on the subset of items to obtain a ranking.

The flowchart 200 continues at block 235 where a ranking function is performed on the subset of the catalog retrieved above with respect to block 210. At block 240, the ranking function ranks the items based on the scoring system below to leverage the exploit-explore mechanism to ensure that better performing potential results show up in the suggested list while ensuring that items with less feedback have the opportunity to show up in the list as well. The ranked items may be provided for presentation or may be used to select a first threshold number of items for presentation.

According to some embodiments, once the items are ranked and selected for presentation, a predetermined number of unranked items may be appended to the ranked list, as shown at block 245. These items may have less than a threshold number of historic selections or may otherwise be determined to be a new item in the catalog. In some embodiments, these appended items may be selected via uniform sampling to reduce confirmation bias.

The flowchart 200 concludes at block 250, where the ranked subset with the appended items is provided for presentation. For example, as described above with respect to FIG. 1, the suggestion list may be provided for display in a suggestion region of a search landing page. In some embodiments, the ranked list may be displayed on a local device or may be transmitted for display on a remote display device.

Figure 3:
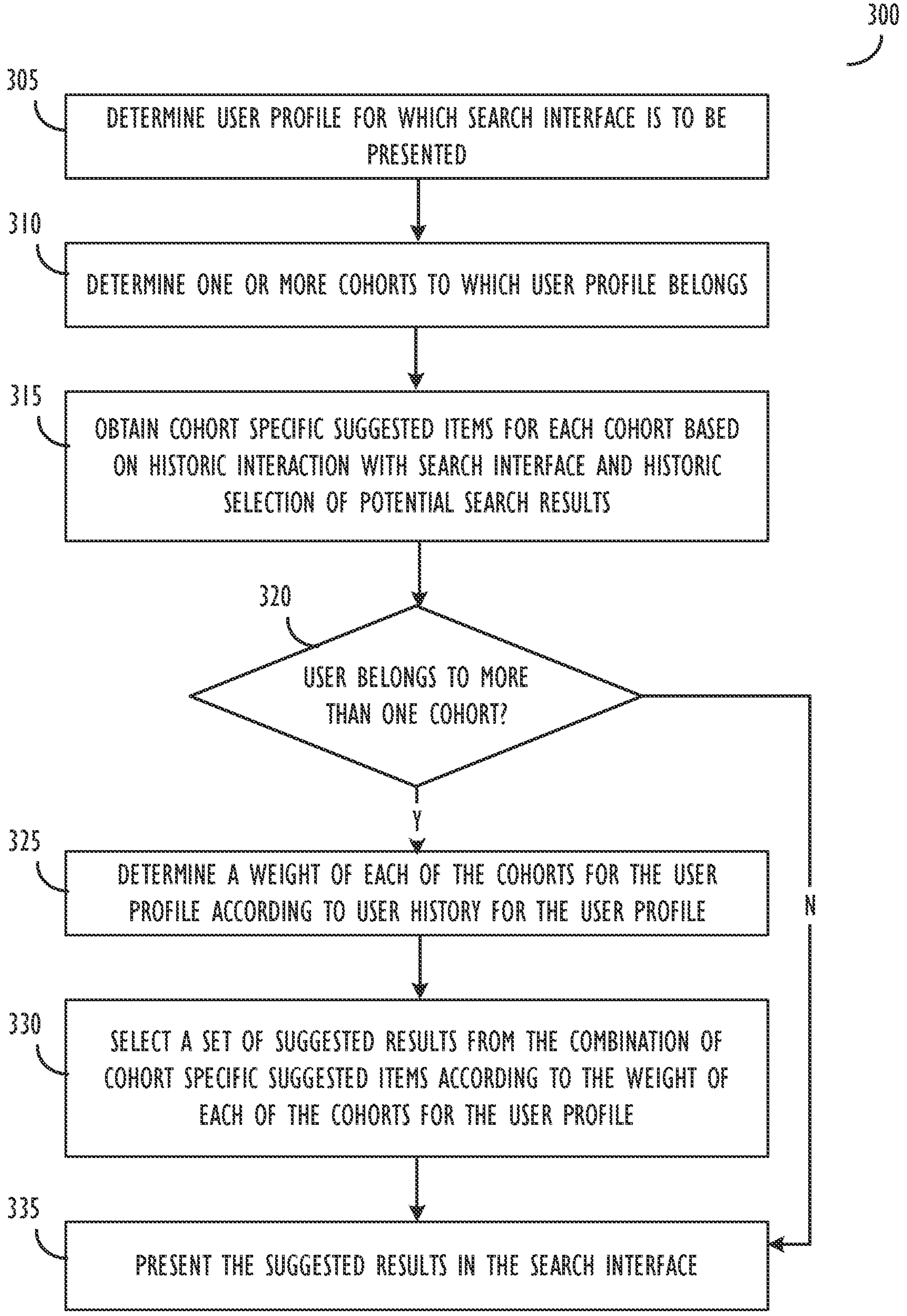
FIG. 3 illustrates a flowchart of a technique for selecting suggested catalog items in accordance with user cohorts, according to some embodiments.

According to one or more embodiments, the suggested items are further refined to be customized for a user. FIG. 3 illustrates a flowchart of a technique for selecting suggested catalog items in accordance with user cohorts, according to some embodiments. Although the various actions are depicted in a particular order, in some embodiments the various actions may be performed in a different order. In still other embodiments, two or more of the actions may occur simultaneously. According to yet other embodiments, some of the actions may not be required or other actions may be included. For purposes of clarity, the flowchart will be described with respect to various particular components. However, it should be understood that the various actions may be taken by alternative components, according to one or more embodiments.

The flowchart 300 begins at block 305 where a user profile is determined for which the search interface is to be presented. In some embodiments, the user profile is determined based on a profile from which the interface is accessed. As an example, a user may log into a service for which the search interface is provided, or the user may access the search interface from within a platform associated with a particular user profile. Additionally, or alternatively, the user profile may be comprised of identifiable information based on a device from which the user is accessing the search interface, such as device type, geographic location, and the like.

The flowchart continues at block 310 where one or more cohorts are identified to which the user belongs. According to some embodiments, by selecting suggested items based on a cohort reduces the time, complexity, and memory requirements for the determination. In addition, by utilizing a cohort-based approach, suggested items can be based on search and selection history from other similar users. According to some embodiments, the cohorts may be determined by obtaining, for a pool of users, a set of historic interactions, such as a search and selection history of potential search result items (e.g., from prior suggested catalog items and/or from actual search results). Users may be clustered based on individual sets of historic interactions to identify clusters of users. In some embodiments, the clustering of the items may be weighted, for example, based on timeliness (e.g., items most recently interacted with are given a greater weight) or other considerations.

According to one or more embodiments, the cohorts may be identified by common traits among the users in the cluster. For example, if the search landing page is associated with a search interface for an online game provider, the historic interactions may be based on the online games users have selected from a search, searched for, selected from a suggested catalog items list, or otherwise interacted with. According to one or more embodiments, the common traits among the items that create the cluster may indicate a cluster identity. To continue the previous example, if a cluster includes users that have puzzle games in common, then the cohort that comprises the users may be based on a puzzle game category. In some embodiments, a user can belong to multiple cohorts. As an example, if a user has two strong categories in their history that cause the user to belong to two cohorts, both cohorts may be considered. In some embodiments, the cohort or cohorts to which a user belongs may be refined periodically based on user activity, updated history from the cohorts, and the like.

The flowchart continues at block 315 where cohort specific suggested items are obtained for each cohort identified at block 310. The cohort specific suggested items may be obtained based on historic interaction with the search interface and historic selection of potential search results among the cohort. As an example, returning to FIG. 2 as described above, the ranked subset may be determined based on historic search session data for a particular cohort. As such, in some embodiments, a set of cohorts may exist to which a user may belong, and each cohort may be associated with a unique suggested set of items based on the search session history among that cohort. At block 320, a determination is made regarding whether the user belongs to more than one cohort. If the user belongs to a single cohort, then the flowchart continues to block 335, and the suggested items for the cohort to which the user belongs are provided for presentation in the search interface, for example, in the Suggested section of the search landing page.

Returning to block 320, if a determination is made that the user belongs to more than one cohort, then the flowchart 300 continues to block 325. At block 325, a determination is made regarding a weight of each of the cohorts that the user profile belongs to. In some embodiments, the weight of each of the cohorts is based on the user history for the user profile. For example, the strength of the user's affinity toward each cohort may indicate a weight for that cohort. That is, the closer a user is to the center of a particular cluster may indicate how strong to weight that cohort among the cohorts to which the user belongs.

The flowchart continues at block 330 where a set of suggested catalog items is selected from among the combination of cohort specific suggested items according to the weight of each of the cohorts for the user profile. For example, if a user's affinity to a "gaming" cohort is twice as strong as the user's affinity to a "lifestyle" cohort, then two thirds of the suggested catalog items may be obtained from the "gaming" cohort suggested catalog items, whereas one third of the suggested catalog items may be selected from the "lifestyle" cohort suggested catalog items. As another example, the set of suggested catalog items may be selected as the "gaming" cohort suggested catalog items based on the user affinity to the "gaming" cohort being stronger than the user's affinity to a "lifestyle" cohort. In other embodiments, additional or alternative parameters may be used to select the suggested catalog items from among the suggested catalog items associated with each cohort to which the user belongs. The flowchart concludes at block 335 where the suggested items for the cohort to which the user belongs are provided for presentation in the search interface, for example, in the Suggested section of the search landing page.

Figure 4:
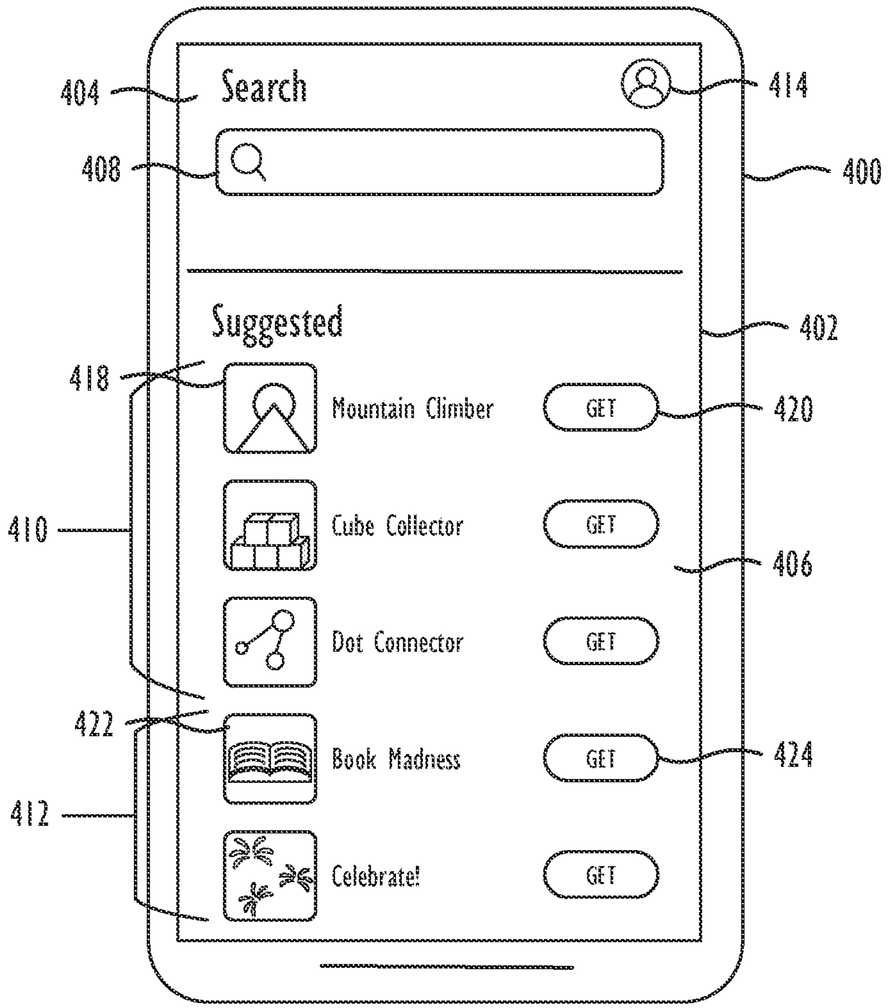
FIG. 4 depicts an example search interface in accordance with one or more embodiments.

Turning to FIG. 4, an example search interface is presented, in accordance with one or more embodiments described herein. It should be understood that the interface presented in FIG. 4 is intended to be an example interface and is not intended to necessarily limit the disclosure herein.

FIG. 4 includes an electronic device 400 on which the user interface is presented on a display. The electronic device 400 may be any kind of electronic device which uses a search interface to provide search results to a user. Further, the electronic device 400 may be used to access local services via the search interface or remote services, for example, through a browser.

The electronic device 400 includes a display on which a search landing page 404 is presented. According to one or more embodiments, the search landing page 404 may be presented in response to receiving a request from a user of electronic device 400 to open a search page. The search landing page 404 may be specific to an application, a website, a device, a service, a data store, or the like. For purposes of this example, the search landing page 404 is a landing page for an app store. As such, a user can utilize the search landing page 404 to identify and download apps hosted by the platform to which the search landing page 404 is provided. In addition, the user can download apps to the electronic device 400 from the search landing page interface 404.

As described above, in some embodiments, the search landing page interface includes a search query input component (e.g., a search bar) 408, as well as a suggested results region 406. The suggested results region includes a set of suggested items available as search results that are selected based on both a likelihood of selection and a search session history corresponding to a historic selection of each of the items from prior suggested results regions for other users. As an example, the Mountain Climber app 418 may be presented as a suggested item, along with a selection input component 420 for the app. In this example, the selection component 420 triggers download of the Mountain Climber app 418 onto the device 400. Notably, in some embodiments, the suggested results region 406 is presented upon a user accessing the search interface and, thus, may not based on any queries submitted during a current search session.

According to one or more embodiments, the search landing page includes a set of suggested results in the suggestion region 406 which may be selected from among potential results based on a two-stage bandit optimization, as described above with respect to FIG. 2. Further, in some embodiments the Suggested region 406 may include items for which no or little history is available. In some embodiments, those items which are appended to the list are presented below the items selected based on history. As such, for purposes of this example, 410 indicates the apps which are selected as suggested items based on historic interaction with those apps during prior search sessions from other users. Meanwhile, 412 indicates the apps for which no or little history is available.

In some embodiments, the suggested items are customized for a user. As described above with respect to FIG. 3, in some embodiments a user interacting with the search interface for the search landing page may be determined to belong to one or more user cohorts. In some embodiments, that determination is made based on historic interaction of the user with the search interface or with items provided by the search interface, such as the apps hosted by the app store in the current example. As shown in the example, a user profile indicator 414 may be presented on the interface and may indicate a user profile for which cohorts are identified and, thus, for which suggested items are presented.

In some embodiments, a current user's interactions with the interface 402 for the search landing page may be used as part of a feedback loop for future suggested items for the current user, for one or more cohorts to which the user belongs, and/or to a global history of search landing page interactions. For example, the user activity during the current session may be counted toward one or more of the metrics considered in the two-stage bandit optimization described above with respect to FIG. 2. For example, if during this session, the user selects input item 424 to download the Book Madness app 422, then the Book Madness app, which was previously unranked for having little or no interaction history, may gain historic interactions and, therefore, be selected for presentation in the apps which are selected as suggested items based on historic interaction with those apps during prior search sessions from other users.

Figure 5:
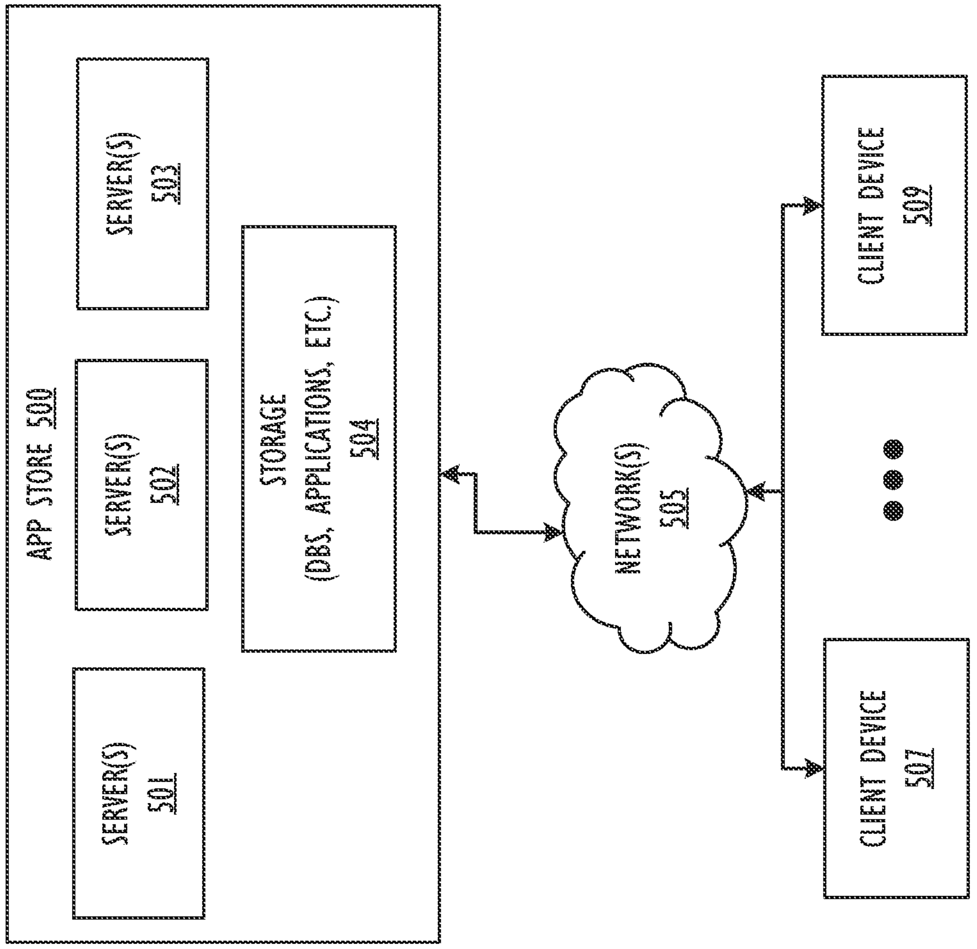
FIG. 5 illustrates an example network diagram in which an app store may be provided, in accordance with one or more embodiments.

The embodiments described herein can operate within and interface with the environment and context of a service for which a search interface is provided. As one example, as described above with respect to FIG. 4, embodiments can be employed in the context of an app store from which one or more users, using client devices, can search for and download one or more applications (also referred to as apps). FIG. 5 depicts an example diagram of network devices across which embodiments described above can be practiced, in particular for this example, in the context of an app store.

An app store 500 can include one or more servers, such as servers 501, 502, and 503, that can provide the functionality described herein. For example, server(s) 501 can interface with a client device to implement the methods of FIGS. 1-3 to generate and/or provide custom search landing pages for presentation at a client device, such as client devices 507 and 509, which can take a variety of different forms (e.g., tablet computer such as an iPad, smartphone such as an iPhone, laptop computer, desktop computer, network media player such as an Apple TV, game/entertainment system, or other consumer electronic device). The client devices 507 and 509 can be coupled to the app store 500 by one or more networks 505, such as the Internet, which provides for the data communication between the client devices and the app store so that the client devices can send search queries to the app store, receive search results, and send requests to download one or more apps and then receive the downloads of the one or more apps. The server(s) 501, in one embodiment, can create the data structures used in providing custom search landing pages with particular suggested results to a particular subset of users (e.g., user cohorts), and store those data structures in storage 504 for later use by server(s) 502 which can be configured to receive search queries from client devices and then perform searches of one or more data structures in order to provide a consistent view of representations of the apps within the app store.

An app store, such as the app store shown in FIG. 5 can collect information about queries used to search for applications, interaction with a suggested results section, downloads that result from a user's selection of an app shown in the search results produced by a search query, and the like. This information can be collected in logs maintained by the app store which record the user interaction with the search interface during each search session. In one embodiment, the one or more servers 502 can maintain a record during a user's search session of the queries used, the selections made from the search results of those queries, and interaction with items on the search landing page, such as the suggested results list. This record can be recorded in one or more logs. In one embodiment, the app store can keep track of user's selections which seek further information about a particular application without necessarily downloading the application, in addition to keeping track of downloads that resulted from a particular search query. Further, in some embodiments, the log may be used to track both a likelihood of selection of the items provided by the search (e.g., the apps hosted by the app store 500) and a search session history corresponding to a historic selection of each item from suggested results regions. For example, the log may be used to track a first number referring to historic sessions in which 1) a particular selectable item was selected and 2) a search query was submitted in the search query input component, as well as a second number related to a number of historic search sessions of the search session history in which the particular selectable item was selected without interaction with the search query input component.

The servers (501, 502, 503) and/or the client devices 507 and 509 can also include memory for storing and/or retrieving apps from the app store 500. According to some embodiments, the client devices 507 and 509 may provide access to the app store 500, on which multiple applications may be hosted. The app store 500 may provide to a particular user a particular treatment for an app information page within the app store for a particular app. That is, a view of an app information page from client device 507 may differ from a view of the app information page from client device 509. In some embodiments, the client devices 507 and 509 may obtain the same binary download package, and the app store 500 may transmit metadata indicating a particular treatment to use for the application such that the user experience maintains consistency from the app information page presented to the user in the app store 500.

Figure 6:
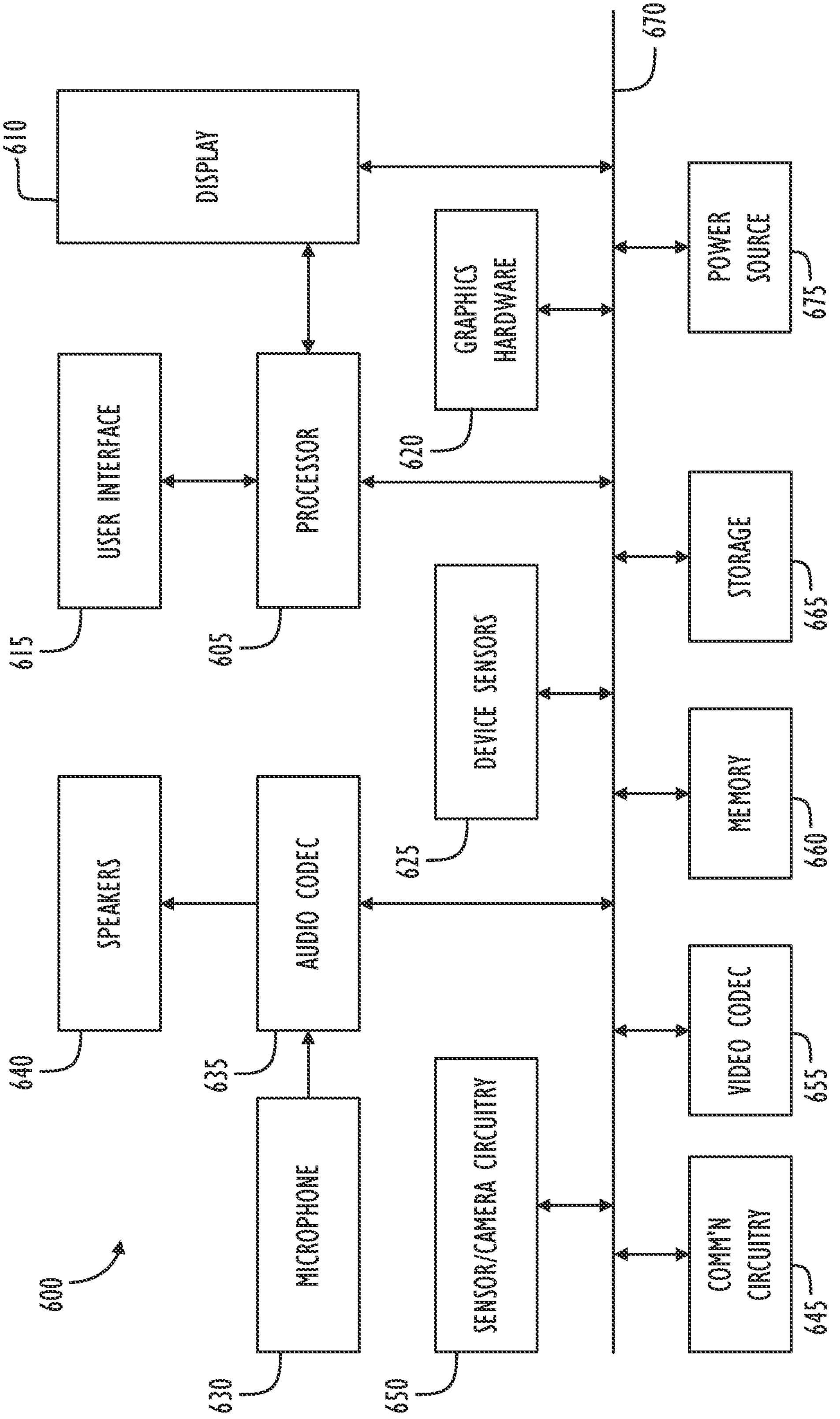
FIG. 6 illustrates a simplified functional block diagram of an illustrative programmable electronic device, in accordance with an embodiment.

Referring now to FIG. 6, a simplified functional block diagram of an illustrative programmable electronic device 600 for providing access to an app store is shown, according to one embodiment. Electronic device 600 could be, for example, a mobile telephone, personal media device, portable camera, tablet, notebook or desktop computer system. As shown, electronic device 600 may include processor 605, display 610, user interface 615, graphics hardware 620, device sensors 625 (e.g., proximity sensor/ambient light sensor, accelerometer and/or gyroscope), microphone 630, audio codec(s) 635, speaker(s) 640, communication circuitry 645, image capture circuit 650 (which may comprise, e.g., multiple camera units/optical sensors having different characteristics as well as camera units that are housed outside of, but in electronic communication with, device 600), video codec(s) 655, memory 660, storage 665, and communications bus 670.

Processor 605 may execute instructions necessary to carry out or control the operation of many functions performed by device 600, such as the generation and/or processing of DAs in accordance with the various embodiments described herein. Processor 605 may, for instance, drive display 610 and receive user input from user interface 615. User interface 615 can take a variety of forms, such as a button, keypad, dial, a click wheel, keyboard, display screen and/or a touch screen. User interface 615 could, for example, be the conduit through which a user may view a captured video stream and/or indicate particular images(s) that the user would like to capture or share (e.g., by clicking on a physical or virtual button at the moment the desired image is being displayed on the device's display screen).

In one embodiment, display 610 may display a video stream as it is captured while processor 605 and/or graphics hardware 620 and/or image capture circuitry contemporaneously store the video stream (or individual image frames from the video stream) in memory 660 and/or storage 665. Processor 605 may be a system-on-chip such as those found in mobile devices and include one or more dedicated graphics processing units (GPUs). Processor 605 may be based on reduced instruction-set computer (RISC) or complex instruction-set computer (CISC) architectures or any other suitable architecture and may include one or more processing cores. Graphics hardware 620 may be special purpose computational hardware for processing graphics and/or assisting processor 605 in performing computational tasks. In one embodiment, graphics hardware 620 may include one or more programmable graphics processing units (GPUs).

Image capture circuitry 650 may comprise one or more camera units configured to capture images, e.g., in accordance with this disclosure. Output from image capture circuitry 650 may be processed, at least in part, by video codec(s) 655, processor 605, graphics hardware 620, and/or a dedicated image processing unit incorporated within image capture circuitry 650. Images so captured may be stored in memory 660 and/or storage 665. Memory 660 may include one or more different types of media used by processor 605, graphics hardware 620, and image capture circuitry 650 to perform device functions. For example, memory 660 may include memory cache, read-only memory (ROM), and/or random access memory (RAM). Storage 665 may store media (e.g., audio, image and video files), computer program instructions or software, preference information, device profile information, and any other suitable data. Storage 665 may include one more non-transitory storage mediums, including, for example, magnetic disks (fixed, floppy, and removable) and tape, optical media such as CD-ROMs and digital video disks (DVDs), and semiconductor memory devices such as Electrically Programmable Read-Only Memory (EPROM) and Electrically Erasable Programmable Read-Only Memory (EEPROM). Memory 660 and storage 665 may be used to retain computer program instructions or code organized into one or more modules and written in any desired computer programming language. When executed by, for example, processor 605, such computer program code may implement one or more of the methods described herein. Power source 675 may comprise a rechargeable battery (e.g., a lithium-ion battery or the like) or other electrical connection to a power supply, e.g., to a main power source, that is used to manage and/or provide electrical power to the electronic components and associated circuitry of electronic device 600.

In the foregoing description, numerous specific details are set forth, such as specific configurations, properties, and processes, etc., in order to provide a thorough understanding of the embodiments. In other instances, well-known processes and manufacturing techniques have not been described in particular detail in order to not unnecessarily obscure the embodiments. Reference throughout this specification to "one embodiment," "an embodiment," "another embodiment," "other embodiments," "some embodiments," and their variations means that a particular feature, structure, configuration, or characteristic described in connection with the embodiment is included in at least one embodiment. Thus, the appearances of the phrase "for one embodiment," "for an embodiment," "for another embodiment," "in other embodiments," "in some embodiments," or their variations in various places throughout this specification are not necessarily referring to the same embodiment. Furthermore, the particular features, structures, configurations, or characteristics may be combined in any suitable manner in one or more embodiments.

In the above description and the following claims, the terms "coupled" and "connected," along with their derivatives, may be used. It should be understood that these terms are not intended as synonyms for each other. "Coupled" is used herein to indicate that two or more elements or components, which may or may not be in direct physical or electrical contact with each other, co-operate or interact with each other. "Connected" is used to indicate the establishment of communication between two or more elements or components that are coupled with each other.

Some portions of the preceding detailed description have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. It should be borne in mind, however, that all of these and similar terms are to be associated with the appropriate physical quantities and are merely convenient labels applied to these quantities. Unless specifically stated otherwise, as apparent from the above discussion, it is appreciated that throughout the description, discussions utilizing terms such as those set forth in the claims below, refer to the action and processes of a computer system, or similar electronic computing system, that manipulates and transforms data represented as physical (electronic) quantities within the computer system's registers and memories into other data similarly represented as physical quantities within the computer system memories or registers or other such information storage, transmission or display devices.

Embodiments described herein can relate to an apparatus for performing a computer program (e.g., the operations described herein, etc.). Such a computer program may be stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

Although operations or methods are described above in terms of some sequential operations, it should be appreciated that some of the operations described may be performed in a different order. Moreover, some operations may be performed in parallel rather than sequentially. Embodiments described herein are not described with reference to any particular programming language. It will be appreciated that a variety of programming languages may be used to implement the various embodiments of the disclosed subject matter. In utilizing the various aspects of the embodiments described herein, it would become apparent to one skilled in the art that combinations, modifications, or variations of the above embodiments are possible for managing components of a processing system to increase the power and performance of at least one of those components. Thus, it will be evident that various modifications may be made thereto without departing from the broader spirit and scope of at least one of the disclosed concepts set forth in the following claims. The specifications and drawings are, accordingly, to be regarded in an illustrative sense, rather than a restrictive sense.

In the development of any actual implementation of one or more of the disclosed concepts (e.g., a software and/or hardware development project, etc.), numerous decisions must be made to achieve the developers' specific goals (e.g., compliance with system-related constraints and/or business-related constraints). These goals may vary from one implementation to another, and this variation could affect the actual implementation of one or more of the disclosed concepts set forth in the embodiments described herein. Such development efforts might be complex and time-consuming but may still be a routine undertaking for a person having ordinary skill in the art of the design and/or implementation of one or more of the inventive concepts set forth in the embodiments described herein.

As described above, one aspect of the present technology is the gathering and use of data available from various sources to improve the delivery to users of suggested catalog items, such as apps in an app store or the like. The present disclosure contemplates that in some instances, this gathered data may include personal information data that uniquely identifies or can be used to contact or locate a specific person. Such personal information data can include demographic data, location-based data, telephone numbers, email addresses, social media handles, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to determine the most useful version of a search landing page. Accordingly, use of such personal information data enables users to have more streamlined and meaningful control of their experience with a service, such as an app store. Further, other uses for personal information data that benefit the user are also contemplated by the present disclosure.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of personalized search landing pages, the present technology can be configured to allow users to select to "opt in" or "opt out" of participation in the collection of personal information data during registration for services or anytime thereafter. In another example, users can select not to provide their content and other personal information data for improved content sharing suggestion services. In yet another example, users can select to limit the length of time their personal information data is maintained by a third party, limit the length of time into the past from which content sharing suggestions may be drawn, and/or entirely prohibit the development of a knowledge graph or other metadata profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health-related applications, data de-identification can be used to protect a user's privacy. De-identification may be facilitated, when appropriate, by removing specific identifiers (e.g., date of birth, etc.), controlling the amount or specificity of data stored (e.g., collecting location data at city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be suggested for sharing to users by inferring preferences based on non-personal information data or a bare minimum amount of personal information, such as the quality level of the content (e.g., focus, exposure levels, etc.), the fact that certain content is being requested by a device associated with a contact of the user, other non-personal information available to the app store, or publicly available information.

As used in the description above and the claims below, the phrases "at least one of A, B, or C" and "one or more of A, B, or C" include A alone, B alone, C alone, a combination of A and B, a combination of B and C, a combination of A and C, and a combination of A, B, and C. That is, the phrases "at least one of A, B, or C" and "one or more of A, B, or C" mean A, B, C, or any combination thereof, such that one or more of a group of elements consists of A, B and C, and should not be interpreted as requiring at least one of each of the listed elements A, B and C, regardless of whether A, B and C are related as categories or otherwise. Furthermore, the use of the article "a" or "the" in introducing an element should not be interpreted as being exclusive of a plurality of elements. Also, the recitation of "A, B, and/or C" is equal to "at least one of A, B, or C." Also, the use of "a" refers to "one or more" in the present disclosure. For example, "a DA" refers to "one DA" or "a group of DAs."

What is claimed is:

1. A method comprising:

receiving a search query via a search query input component of a search interface, wherein the search query is received from a user profile associated with a current user, wherein the user profile is associated with one or more user cohorts;

determining a set of potential search results based on the search query;

applying a two-layer bandit operation to the set of potential search results, comprising:

in a first layer of the two-layer bandit operation, selecting suggested results from the set of potential search results by performing a recall function on the potential search results based on:

a first historic selection rate of each of the set of potential search results by prior users when presented as a prior search result, and a second historic selection rate of each of the set of potential search results by prior users when presented on a search landing page prior to a search query being received, wherein the first historic selection rate and second historic selection rate are determined based on a plurality of user interaction logs comprising selection data detected at multiple additional devices from multiple additional user profiles, and in a second layer of the two-layer bandit operation, ranking the suggested results based on, for each of the suggested results, the first historic selection rate, the second historic selection rate, and a cohort to which each of the current user and the prior users belong;

selecting suggested applications comprising one or more of the suggested results based on the ranking, and one or more of a second plurality of applications that fail to comprise a threshold amount of historic interaction data; and presenting the suggested applications in a suggested results region of the search interface.

2. The method of claim 1, wherein the suggested result region further comprises one or more additional selectable items for which a threshold search session history is not satisfied.

3. The method of claim 1, further comprising, for each selectable item of a catalog of available items:

determining the first historic selection rate based on a first number of historic search sessions of the search session history in which 1) a particular selectable item was selected and 2) a search query was submitted in the search query input component; and determining the second historic selection rate based on a second number of historic search sessions of the search session history in which the particular selectable item was selected without interaction with the search query input component.

4. The method of claim 3, further comprising:

ranking the set of selectable items in accordance with the first number of historic sessions and second number of historic search sessions for each of the selectable items in the set of selectable items, wherein the set of selectable items are presented in the suggested results region in accordance with the ranking.

5. The method of claim 1, wherein the search interface is presented in response to a request from the user profile, and wherein the set of selectable items is selected based on the user profile.

6. The method of claim 5, further comprising:

determining the cohort from a plurality of user cohorts to which the user profile belongs.

7. The method of claim 6, further comprising:

determining a weight for each of the plurality of user cohorts to which the user profile belongs, wherein the suggested results are ranked based on the weight for each of the plurality of user cohorts.

8. The method of claim 1, wherein the search interface is presented as part of an app store and wherein the set of selectable items comprises a set of applications available on the app store.

9. A non-transitory computer readable medium comprising computer readable code executable by one or more processors to:

receive a search query via a search query input component of a search interface, wherein the search query is received from a user profile associated with a current user, wherein the user profile is associated with one or more user cohorts;

determine a set of potential search results based on the search query;

apply a two-layer bandit operation to the set of potential search results, comprising:

in a first layer of the two-layer bandit operation, select suggested results from the set of potential search results by performing a recall function on the potential search results based on:

a first historic selection rate of each of the set of potential search results by prior users when presented as a prior search result, and a second historic selection rate of each of the set of potential search results by prior users when presented on a search landing page prior to a search query being, wherein the first historic selection rate and second historic selection rate are determined based on a plurality of user interaction logs comprising selection data detected at multiple additional devices from multiple additional user profiles, and in a second layer of the two-layer bandit operation, rank the suggested results based on, for each of the suggested results, the first historic selection rate, the second historic selection rate, and a cohort to which each of the current user and the prior users belong; and the suggested results based on, for each of the suggested results, the first historic selection rate, the second historic selection rate, and a cohort to which each of the current user and the prior users belong;

selecting suggested applications comprising one or more of the suggested results based on the ranking, and one or more of a second plurality of applications hosted on the platform for which the platform fails to comprise a threshold amount of historic interaction data; and present the suggested applications in a suggested results region of the search interface.

10. The non-transitory computer readable medium of claim 9, wherein the suggested result region further comprises one or more additional selectable items for which a threshold search session history is not satisfied.

11. The non-transitory computer readable medium of claim 9, further comprising computer readable code to, for each selectable item of a catalog of available items:

determine the first historic selection rate based on a first number of historic search sessions of the search session history in which 1) a particular selectable item was selected and 2) a search query was submitted in the search query input component; and determine the second historic selection rate based on a second number of historic search sessions of the search session history in which the particular selectable item was selected without interaction with the search query input component.

12. The non-transitory computer readable medium of claim 11, further comprising computer readable code to:

rank the set of selectable items in accordance with the first number of historic sessions and second number of historic search sessions for each of the selectable items in the set of selectable items, wherein the set of selectable items are presented in the suggested results region in accordance with the ranking.

13. The non-transitory computer readable medium of claim 9, wherein the search interface is presented in response to a request from the user profile, and wherein the set of selectable items is selected based on the user profile.

14. The non-transitory computer readable medium of claim 13, further comprising computer readable code to:

determine the cohort from a plurality of user cohorts to which the user profile belongs.

15. The non-transitory computer readable medium of claim 14, the non-transitory computer readable medium further comprising computer readable code to:

determine a weight for each of the plurality of user cohorts to which the user profile belongs, wherein the suggested results are ranked based on the weight for each of the plurality of user cohorts.

16. The non-transitory computer readable medium of claim 9, wherein the search interface is presented as part of an app store and wherein the set of selectable items comprises a set of applications available on the app store.

17. A system comprising:

one or more processors; and one or more computer readable media comprising computer readable code executable by the one or more processors to:

receive a search query via a search query input component of a search interface, wherein the search query is received from a user profile associated with a current user, wherein the user profile is associated with one or more user cohorts;

determine a set of potential search results based on the search query, wherein the potential search results comprise a first plurality of applications hosted on a platform for which the platform comprises a threshold amount of historic user interaction data;

apply a two-layer bandit operation to the set of potential search results, comprising:

in a first layer of the two-layer bandit operation, select suggested results from the set of potential search results by performing a recall function on the potential search results based on:

a first historic selection rate of each of the set of potential search results by prior users when presented as a prior search result, and a second historic selection rate of each of the set of potential search results by prior users when presented on a search landing page prior to a search query being, wherein the first historic selection rate and second historic selection rate are determined based on a plurality of user interaction logs comprising selection data detected at multiple additional devices from multiple additional user profiles, and in a second layer of the two-layer bandit operation, rank the suggested results based on, for each of the suggested results, the first historic selection rate, the second historic selection rate, and a cohort to which each of the current user and the prior users belong; and the suggested results based on, for each of the suggested results, the first historic selection rate, the second historic selection rate, and a cohort to which each of the current user and the prior users belong;

selecting suggested applications comprising one or more of the suggested results based on the ranking, and one or more of a second plurality of applications hosted on the platform for which the platform fails to comprise a threshold amount of historic interaction data; and present the suggested applications in a suggested results region of the search interface.

18. The system of claim 17, wherein the suggested result region further comprises one or more additional selectable items for which a threshold search session history is not satisfied.

19. The system of claim 17, further comprising computer readable code to, for each selectable item of a catalog of available items:

determine the first historic selection rate based on a first number of historic search sessions of the search session history in which 1) a particular selectable item was selected and 2) a search query was submitted in the search query input component; and determine the second historic selection rate based on a second number of historic search sessions of the search session history in which the particular selectable item was selected without interaction with the search query input component.

20. The system of claim 19, further comprising computer readable code to:

rank the set of selectable items in accordance with the first number of historic sessions and second number of historic search sessions for each of the selectable items in the set of selectable items, wherein the set of selectable items are presented in the suggested results region in accordance with the ranking.

* * * * *